(No Model.) 9 Sheets—Sheet 3.

C. H. MANNECK & W. WITTE.
BOX MAKING AND COVERING MACHINE.

No. 294,486. Patented Mar. 4, 1884.

Fig-3-

Witnesses:
L. C. Hills
W. B. Masson

Inventors:
Charles Henry Manneck
and William Witte
by E. E. Masson
atty.

(No Model.) 9 Sheets—Sheet 6.

C. H. MANNECK & W. WITTE.
BOX MAKING AND COVERING MACHINE.

No. 294,486. Patented Mar. 4, 1884.

Witnesses:
L. C. Hills.
W. B. Masson.

Inventors:
Charles Henry Manneck
and William Witte
by E. E. Masson
atty.

(No Model.) 9 Sheets—Sheet 8.

C. H. MANNECK & W. WITTE.
BOX MAKING AND COVERING MACHINE.

No. 294,486. Patented Mar. 4, 1884.

Witnesses:
L. C. Hills.
W. B. Masson

Inventors:
Charles Henry Manneck
and William Witte
by E. E. Masson
atty.

UNITED STATES PATENT OFFICE.

CHARLES HENRY MANNECK, OF BROOKLYN, NEW YORK, AND WILLIAM WITTE, OF NEW HAVEN, CONNECTICUT.

BOX MAKING AND COVERING MACHINE.

SPECIFICATION forming part of Letters Patent No. 294,486, dated March 4, 1884.

Application filed May 19, 1883. (No model.)

*To all whom it may concern:*

Be it known that we, CHARLES HENRY MANNECK, a citizen of the United States, residing at Brooklyn, in the county of Kings, State of New York, and WILLIAM WITTE, a citizen of the United States, residing at New Haven, in the county of New Haven and State of Connecticut, have invented certain new and useful Improvements in Box Making and Covering Machines, of which the following is a specification.

Our invention relates to improvements in box making and covering machines in which a series of paste-boxes and strips of papers taken from rolls are secured; and the objects of our improvements are to provide novel means, first, for regulating the amount of paste applied to the paper; and, second, to afford facilities for the proper adjustment of the supporting-rolls, the rotary cutter, the box-block, the box-clamp, and paper-pressing rolls, and other means hereinafter described, and specifically set forth in the claims. We attain these objects by the mechanism illustrated in the accompanying drawings, in which—

Similar letters refer to similar parts throughout the several views.

Figure 1:
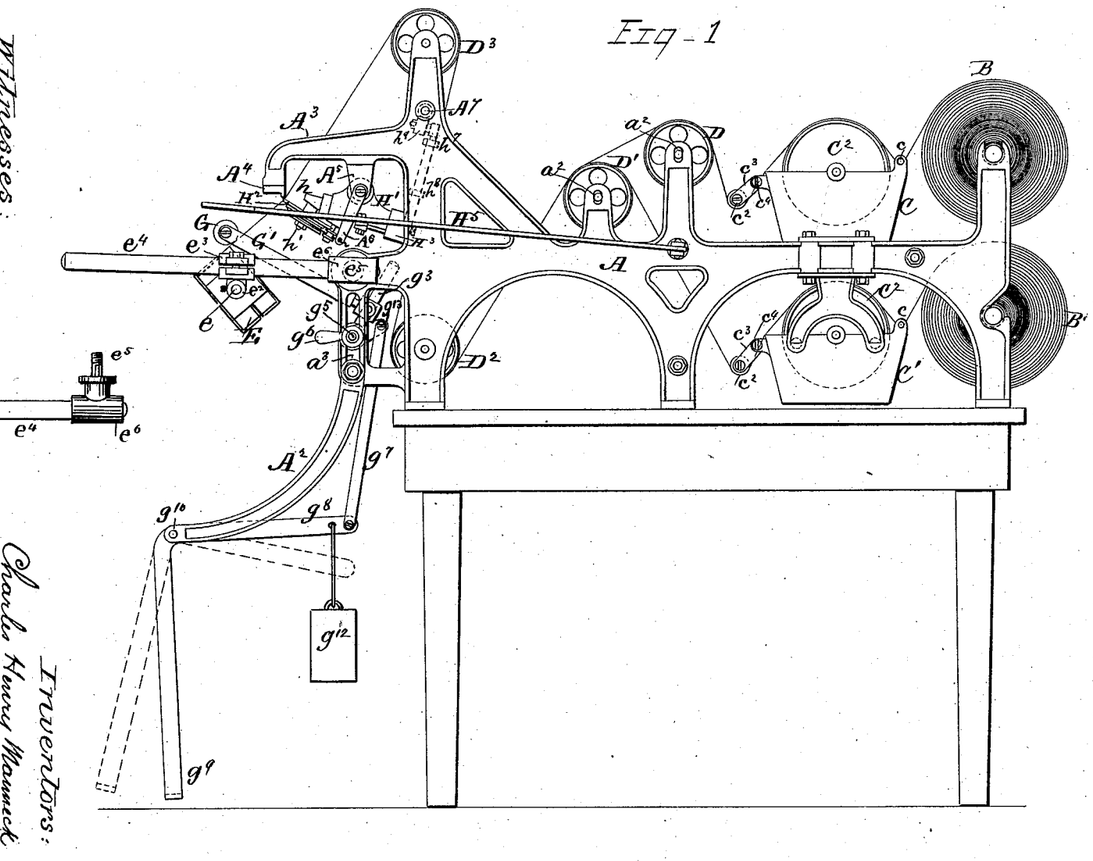
Figure 1 is a side view of the machine, in which the roller-supporting screws are removed.
Figure 2:
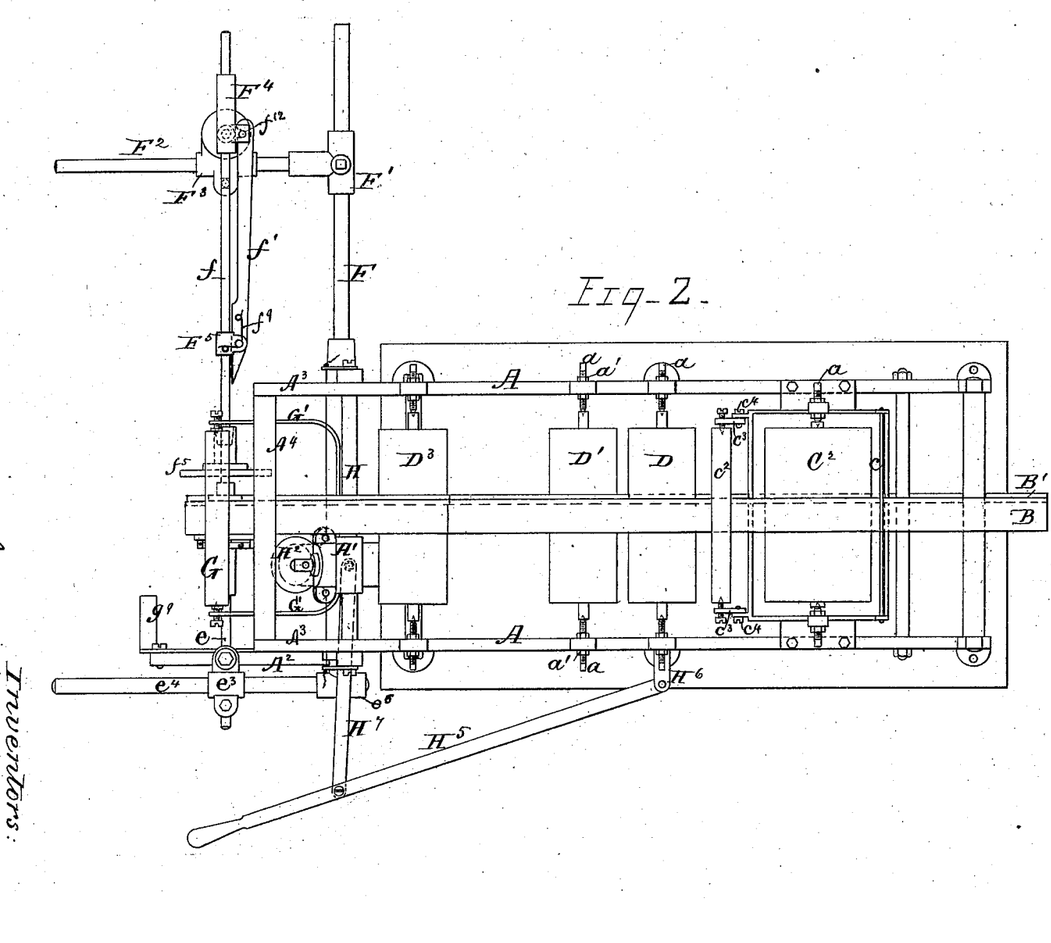
Fig. 2 is a plan view of the machine.

In said drawings, A represents a frame adapted to be placed upon a table or upon legs, to have the operative parts within easy reach of a person's hands. Upon one end of this frame are mounted, as shown in Figs. 1 and 2, the shafts carrying rolls of paper B B', the strip upon the upper roll, B, being most commonly wider than the other. Adjoining the paper rolls there are secured to the frame A the boxes C and C', containing paste, glue, or other suitable adhesive composition, within which the paste-rolls $C^2$ are adapted to revolve, their shafts being mounted in suitable journal-boxes upon the edge of the paste-boxes. To bring the strips of papers in contact with the surface of the paste-rolls, the rear end of each paste-box is provided with a transverse rod, $c$, under which the strip of paper is first made to pass. After passing over the paste-roll, it is desirable to remove any surplus of paste adhering to the paper, the excess varying according to the consistency of the paste and the amount in the paste-box. This surplus is removed by causing the pasted side of the strip of paper to rub against the acute forward edge, $c'$, of the paste-box. This is accomplished in this instance by passing the strip of paper under a roll, $c^2$, mounted on the outer ends of arms $c^3$, pivoted to lugs projecting from the paste-box, and retained connected adjustably thereto by means of screws $c^4$. These arms $c^3$ and roll $c^2$ being thus capable of swinging in an arc of a circle, the relative position of the strip of paper to the acute or paste-scraping edge of the box can be adjusted with great precision, according to the condition and amount of paste in the paste-box. After having passed under the rolls $c^2$, the upper strip, B, is passed over the roll D, while the under strip, B', is passed over the roll D', located in advance of the roll D, and it is upon this roll that in this instance the two strips come in contact with each other and become united, the edge of one strip generally extending beyond the other. To cause nearly all the rolls of the machine to run with as little friction as possible, their shafts are carried up on conical points, forming one end of the screws $a$, secured to the frame by jam-nuts $a'$. To cause one edge of one strip to project uniformly beyond the edge of the other during the entire delivery of a series of coiled strips without the use of guides is somewhat difficult, as the texture of one edge of either strip may differ from the other, absorb more paste than the other, and become more elongated. We accomplish this object by forming slots $a^2$ (vertically, or nearly so) in the frame A opposite the ends of the rolls D and D', through which the conical-pointed screws $a$ pass, and these screws $a$ are clamped at the desired point in the slots by jam-nuts on each side of the frame, so that either end of the roller D or of the roll D' can be set slightly higher than the opposite end, and thereby cause the strip or strips of paper to creep sidewise toward the higher point upon said roll or rolls. After the two strips have been united in proper relative position upon the roll D', they pass together under the roll $D^2$, where they become bent or "tempered" in one direction, and then over the roll $D^3$, where they are bent in the opposite direction, and from this latter roll they will pass to the box, upon which they are to remain. Said box (or simply its sides or its tube) is mounted upon a block of peculiar construction mounted upon a shaft, $e$, passing through a long bearing, $e'$, in which it can rotate, but is prevented from moving lengthwise by collars $e^2$, set upon said shaft at each end of said bearing $e'$. This bearing is carried by a clamp, $e^3$, adjustably secured upon a rod, $e^4$, projecting from the forward end of one of the side frames, A, said frame being provided at that point with a circular cavity or bearing to receive one end of a T-shaped sleeve, $e^6$, into which the inner end of the rod $e^4$ enters; and said sleeve is secured by a pivot-bolt, $e^5$, that permits it and the rod $e^4$ to be set at any angle, but in a parallel plane with the side of the frame A.

Figure 12:
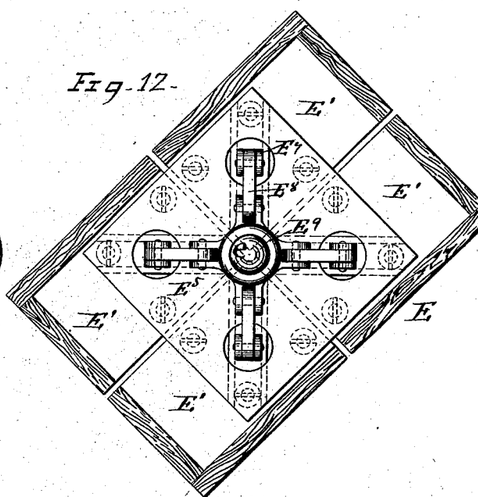
Figure 13:
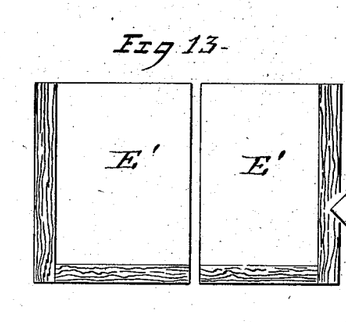
Figures 14, 15:
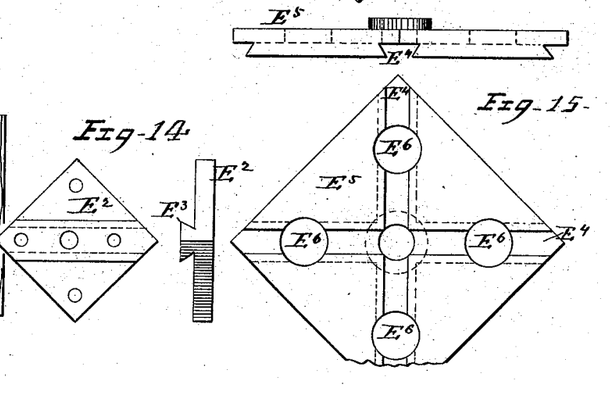

The hollow box-block E has sides that can be contracted in size to easily enter a box, and expanded again to closely fit the interior of said box. It is made of four quarters or corner-pieces, E'. (See Figs. 12 and 13.) Each quarter has secured in its interior a small rectangular plate, $E^2$, provided with a dovetailed tenon, $E^3$, and the tenon of each plate is made to enter into dovetailed grooves $E^4$, pointing toward a common center in a rectangular plate, $E^5$, having four slots or large holes, $E^6$, and through these holes is made to pass with free play the screws $E^7$, to the outer end of which is pivoted one end of the connecting-rod $E^8$, and the opposite end of each of said connecting-rods $E^8$ is pivoted to lugs projecting from the sides of a sleeve, $E^9$, adapted to move longitudinally upon the shaft $e$, so that by moving the sleeve $E^9$ a short distance away from the plate $E^5$ the four quarters E' forming the shell of the box-block are brought close together, and said box-block occupies less space and can be easily introduced into the box to be operated upon. The operator then slides the sleeve back toward the plate $E^5$, thus throwing the connecting-rods $E^8$ at right angles to said sleeve and the periphery of the four quarters snugly against the interior of the box. The plate $E^5$ is secured upon the end of the shaft $e$, and can revolve with it, as well as the parts connected therewith and forming the box-block. Expansion box-blocks made of segments and toggle-links operated by a sliding sleeve are, however, well known in box-machines. To retain the bottom of the box against the box-block, a presser-rod, $f$, is used and kept against said bottom by positive means, the springs heretofore used for that purpose being dispensed with. To sustain the presser-rod in proper position relatively to the box-block, there is secured to one side of the frame A a horizontal rod, F, upon which is adjustably mounted a sleeve, F', carrying at right angles thereto another rod, $F^2$, extending toward the front of the machine, and upon the rod $F^2$ the sleeve $F^3$ is adjustably mounted. The sleeve $F^3$ has preferably bolted thereon another sleeve, $F^4$, to receive the presser-rod $f$, and the latter is free to slide in said sleeve when not otherwise retained immovable by the latch $f'$, as will be stated.

Upon the end of the rod $f$ is mounted a small disk or button, $f^2$, capable of rotating thereon, being secured by a central screw, $f^3$, and also adapted to rotate with the box operated upon. Upon the same portion of the presser-rod $f$ is also mounted a sleeve, $f^4$, carrying a facing-board, $f^5$, to press against the staying-strips of paper folded over the bottom of the box by the attendant. The sleeve $f^4$ has a cavity, $f^6$, at one end, to receive the stem of the button $f^2$ and the nuts $f^7$ placed upon the rod $f$, to adjust the parts so that the face of the facing-board $f^5$ will come even with the face of the rotary button $f^2$ when the stem of the latter is within the sleeve. Within the opposite end of the sleeve there is a tapering chamber, $f^8$, to engage with the beveled end of the latch $f'$ when it is desired to slide the presser-rod away from the box after the latter is completed. The latch $f'$ is pivoted near its beveled end to a sleeve, $F^5$, mounted adjustably upon the presser-rod $f$, and a coiled spring, $f^9$, secured to said sleeve, normally forces the beveled end of the latch away from the presser-rod. The opposite end of the latch has a notch, $f^{10}$, formed in its side, to straddle a pin, $f^{12}$, secured to the presser-rod-supporting sleeve $F^4$.

Figure 3:
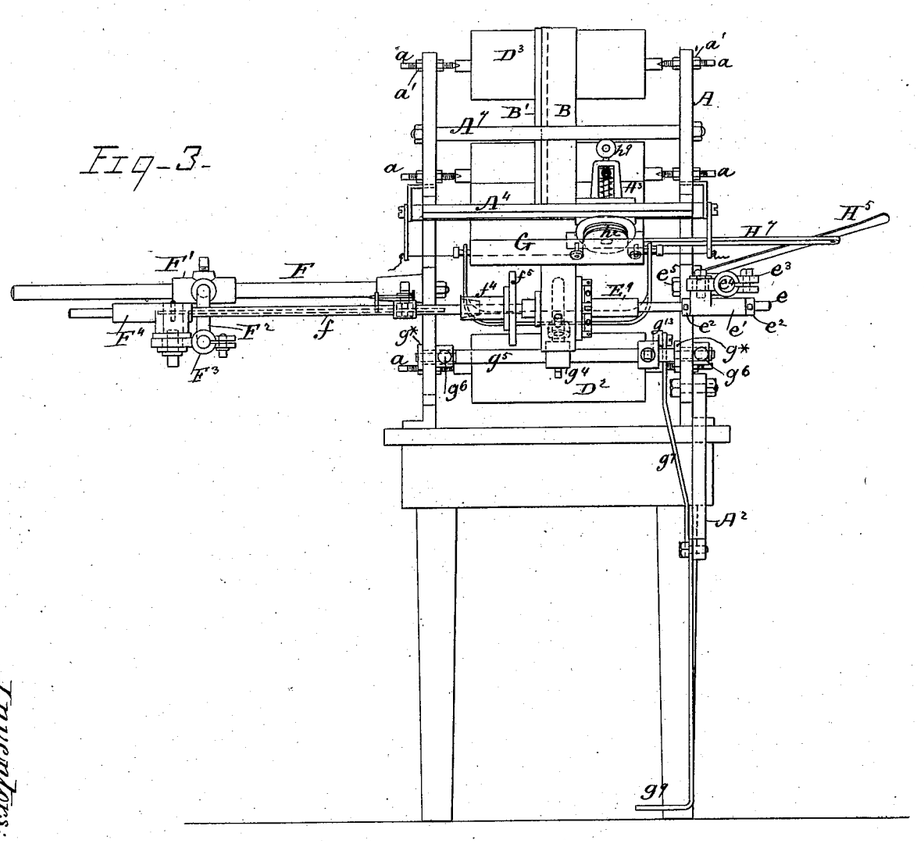
Fig. 3 is a front view of the same.
Figure 4:
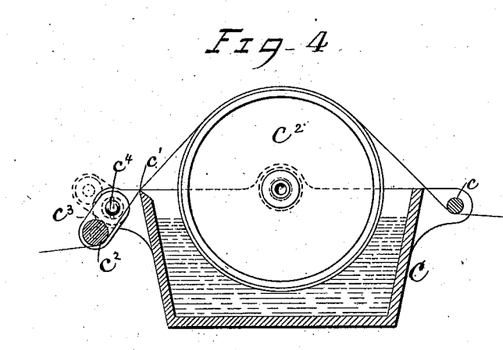
Figs. 4, 5, 6, 7 represent, respectively, a longitudinal vertical section, a transverse section, a top view, and a rear view of one of the paste-boxes and rolls connected thereto.
Figure 5:
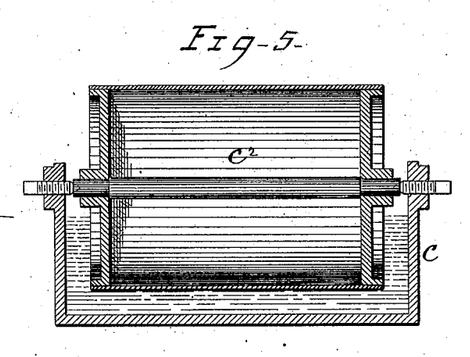
Figure 6:
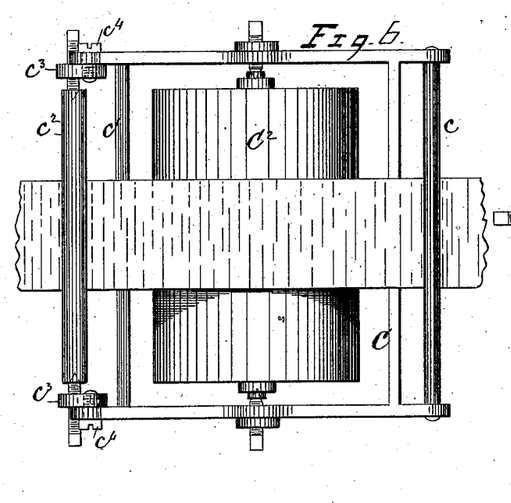
Figure 7:
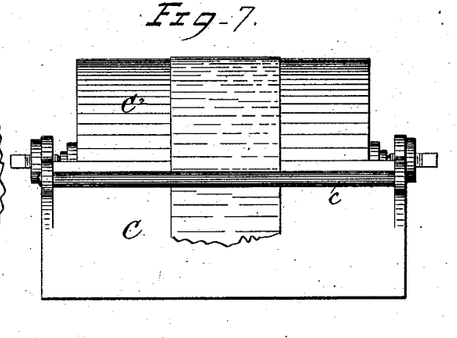
Figures 8, 9, 10:
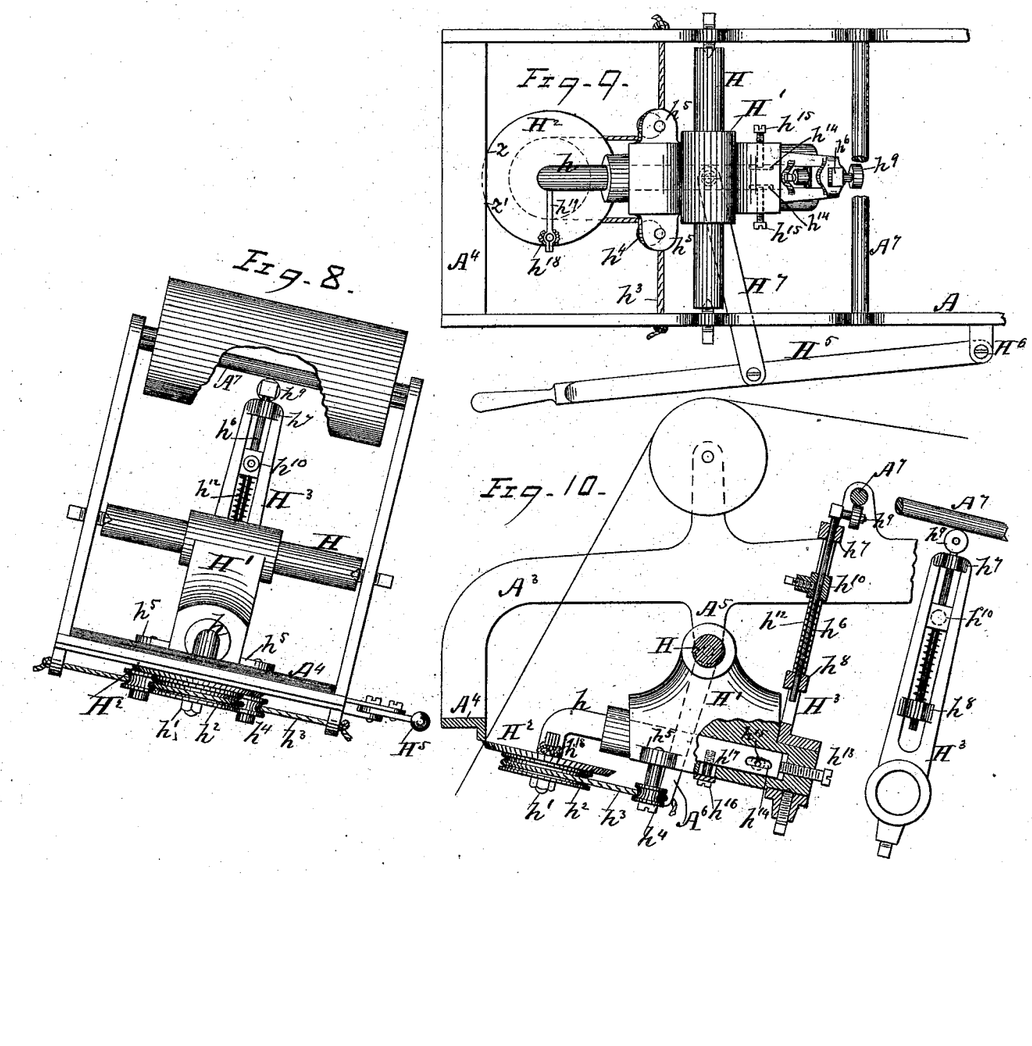
Figs. 8, 9, 10 represent, respectively, in front view, plan, and vertical section, the portion of the machine carrying the paper-cutters, Fig. 10 showing also a rear view of the cutters, spring-presser, and guide.
Figure 11:
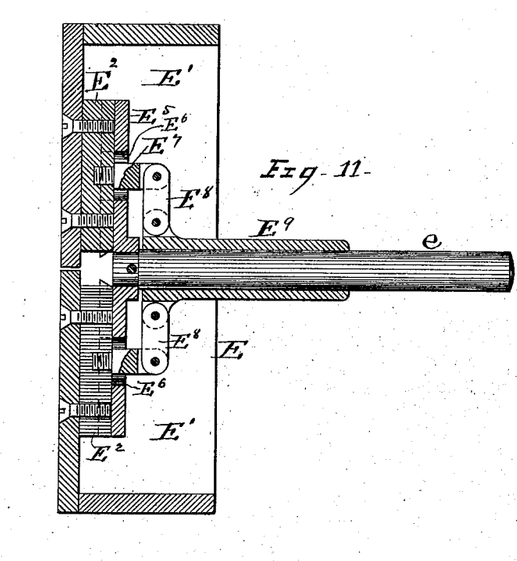
Figs. 11 to 15, inclusive, represent the box-supporting block in vertical section and in side view, and also its component parts.
Figures 16, 17, 18, 19, 20, 21:
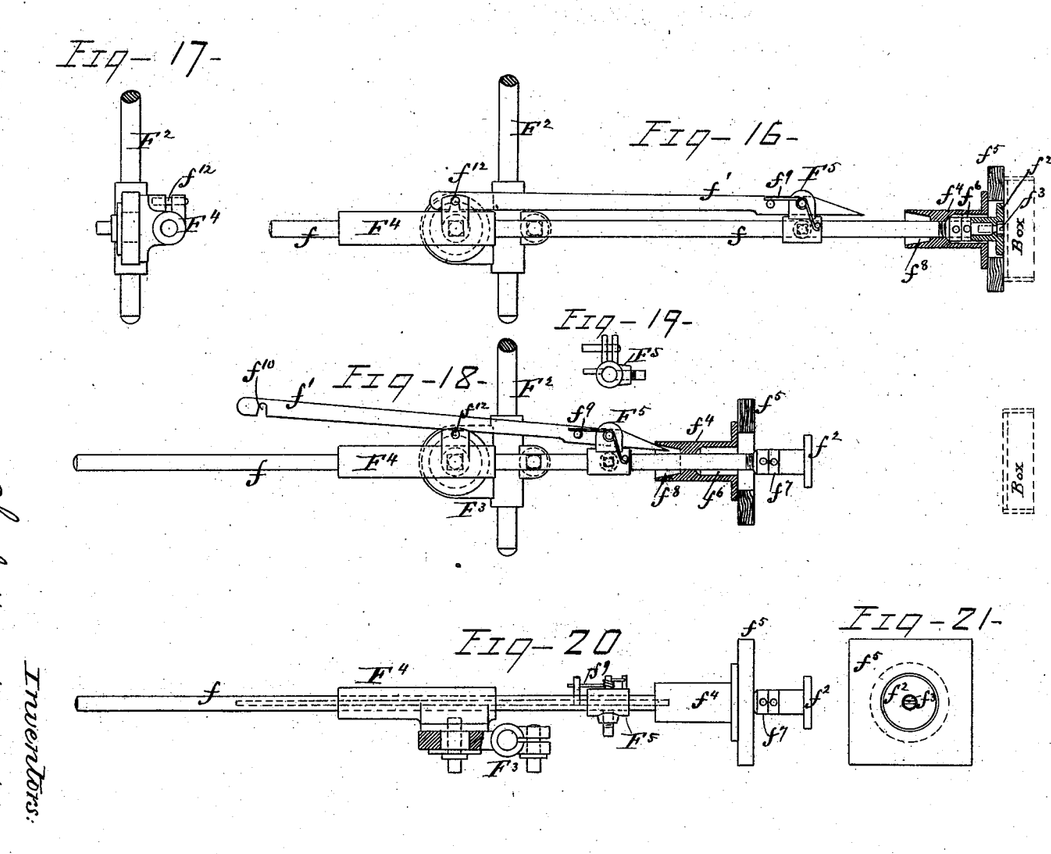
Figs. 16 to 21, inclusive, represent detail views of the mechanism used for clamping the bottom of the box against the edges of its sides.
Figure 22:
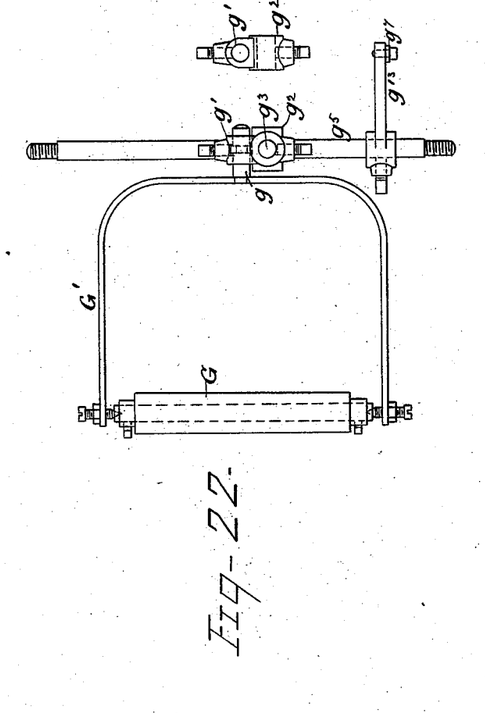
Figs. 22, 23, 24 represent, respectively, in plan, front, and side views, the paper-pressing roller and its support.
Figure 23:
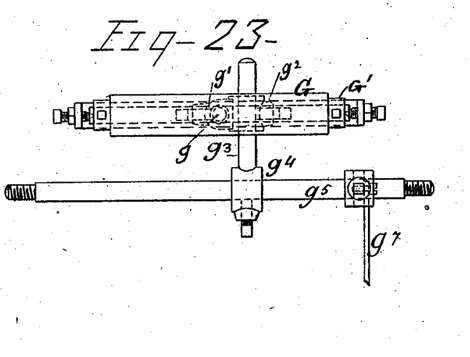
Figure 24:
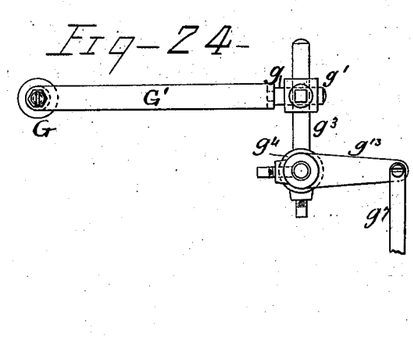

To operate with this device: Supposing the presser-rod to be at a distance from the box-block, as shown in Fig. 18, the sides of the box (and the bottom preferably placed loosely within said sides) are placed upon the box-block, and the operator places one hand upon the sleeve $E^9$ of the box-block, while with the other hand the operator takes hold of the rod $f$ by means of its sleeve $f^4$ and brings the button and facing block forcibly against the bottom of the box, the two hands moving at the same time toward each other. The notched end $f^{10}$ of the latch, coming also at the same time into engagement with the pin $f^{12}$, locks the parts together. The sleeve $f^4$ is then pushed sufficiently away from the retaining-button $f^2$ for the presser-roller G to operate freely upon the covering-strips of the box under construction. This roller G is journaled upon the ends of a bent frame or arms, G', having a pivot-pin, $g$, adjustably journaled at any desired angle in a bearing, $g'$, forming part of a sleeve, $g^2$, and this sleeve $g^2$ is mounted adjustably upon a nearly vertical rod, $g^3$, projecting from a sleeve, $g^4$, adjustably secured upon a shaft, $g^5$, extending across the front part of the machine. The ends of this shaft rest in journal-boxes $g^*$, Fig. 3, that pass through slots $a^3$ in the frame, and said boxes are retained at any desired height therein by clamping them in said slots between shoulders on one end of the boxes $g^*$ and hand-nuts $g^6$ placed upon the other end. The shaft $g^5$ carries a crank-lever, $g^{13}$, to the outer end of which is pivoted the connecting-rod $g^7$, and the latter is connected with one end of a bell-crank lever, $g^8$, carrying a weight, $g^{12}$, to keep the presser-roll G upward when not in use. The opposite end of the bell-crank lever is provided with a bent portion, forming a treadle, $g^9$. This bell-crank lever is pivoted at $g^{10}$ to an arm, $A^2$, secured to the frame on the front portion thereof, so that when the operator puts his foot on the treadle and swings it toward the machine the connecting-rod $g^7$ is elevated and the presser-roll is brought down upon the box, and its covering-strips are made to adhere firmly to the sides of the box. A brush may also be used in place of the roll G.

The machine is also provided with means for cutting the strips of paper transversely, as follows: To the under side of two arms, $A^3$, projecting from the front portion of the frame, is secured a ledger-blade, $A^4$, extending across the machine. These arms $A^3$ have pendent lugs $A^5$, carrying a transverse rod, H, upon which is mounted somewhat loosely (so that it can slide easily thereon) a sleeve, H', that carries the rotary cutter $H^2$, as follows: The sleeve H' is also bored transversely to the opening fitting the shaft H, and receives a shaft, $h$, having its forward end bent downward, or composed of two pieces set at an angle to form the journal for the cutter $H^2$, the latter being retained upon the lower end of the shaft $h$ by a nut, $h'$. To rotate this cutter, it is provided with a pulley, $h^2$, on the under side thereof, around which a rope, $h^3$, is made to pass to give it motion. This rope is secured at each end to arms $A^6$, extending downward from the lugs $A^5$, or forming a part thereof. It passes also around small guide-pulleys $h^4$, mounted upon studs pendent from lugs $h^5$, formed upon the sides of the sleeve H'. To force the upper side of the rotary cutter against the under side of the ledger-blade, the rear end of the sleeve H' is provided with an arm, $H^3$, secured thereto, and extending upward, and having bearings $h^7$ $h^8$ for a rod, $h^6$, to slide through. To the upper end of this rod is mounted a small roller, $h^9$, adapted to travel against the under side of a transverse rod, $A^7$, uniting the two sides of the frame. Secured upon the rod $h^6$ about half-way of its length is a sleeve, $h^{10}$, and between this sleeve and the bearing $h^8$ a coiled spring, $h^{12}$, is mounted upon the rod $h^6$, so as to force its lower bearing, $h^8$, and with it the rear end of the sleeve H', downward, and consequently the forward portion of the upper face of the rotary cutter against the under side of the ledger-blade, and adapt it to follow any irregular surfaces that may be thereon, caused by defective grinding. To make up for wear of the rotary cutter, there is bearing against the rear end of the shaft $h$ a screw, $h^{13}$, secured to the sleeve H'. Great difficulties have been experienced in attempting to cut damp or pasted paper with cutters of this nature. We now overcome the difficulties by slightly tipping the cutting-edge of the rotary cutter upward toward the ledger-blade while the rotary cutter is advancing in either direction across the machine, as follows: Within the rear end of the shaft $h$ (carrying the rotary cutter) longitudinal slots or grooves $h^{14}$ are formed, within which the points of two screws, $h^{15}$, enter, taking care that the entering tip of said screw is somewhat smaller than the width of the grooves $h^{14}$, so as to allow the shaft $h$ to rock within narrow limits in its socket, and thus permit the rotary cutter to also rock or tip against the ledger-blade. This tipping is caused by the hand-lever $H^5$, through which the sleeve H' is moved across the machine. This lever $H^5$ is pivoted to the side of the frame A at $H^6$, and is provided about half-way of its length with a connecting-rod, $H^7$, pivoted thereto at one end, and having its opposite end pivoted to a screw or stud, $h^{16}$, secured to the under side of the cutter-shaft $h$, said screw $h^{16}$ passing through a slot, $h^{17}$, formed in the under side of the sleeve H', (in place of the slot $h^{17}$, a cylindrical hole may be used, if made somewhat larger than the body of the screw $h^{16}$,) and permits the shaft $h$ to rock in its bearings.

The operation of this portion of the machine is as follows: When the operator draws the handle of the lever $H^5$ toward the frame of the machine, the connecting-rod $H^7$, acting against the screw or stud $h^{16}$, slightly tips its head toward the left side of the machine, and the shaft $h$ being slightly revolved or rocked thereby to one side, the portion $z$ of the revolving cutter becomes higher than the portion $z'$, and thus produces a shear cut against the edge of the ledger-blade at the point $z$. When the handle of the lever $H^5$ is moved away from the frame of the machine, the connecting-rod $H^7$ pulls the head of the screw $h^{16}$ toward said lever $H^5$ and tips the rotary cutter, so that the portion $z'$ becomes higher than the portion $z$, and the shear cut against the ledger-blade is produced at the point $z'$. Adjoining the edge of the rotary cutter a sponge, $h^{18}$, or its equivalent, is secured to a small arm, $h^{19}$, projecting from the side of the shaft $h$, to remove any paste adhering to the edge of the cutter. The hand-lever could be easily connected with a treadle within reach of the left foot of the operator by means of bell-cranks or other well-known mechanical means.

Figure 25:
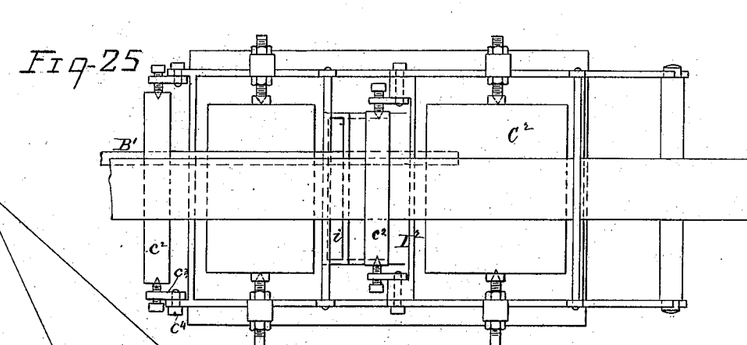
Figs. 25, 26, 27 represent, respectively, in plan, side views, and front view, a modified form of paste-box mounted upon its frame.
Figure 26:
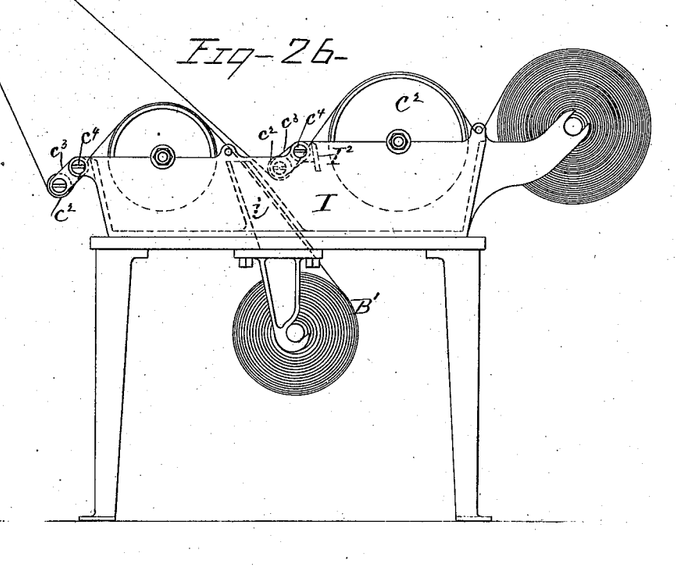
Figure 27:
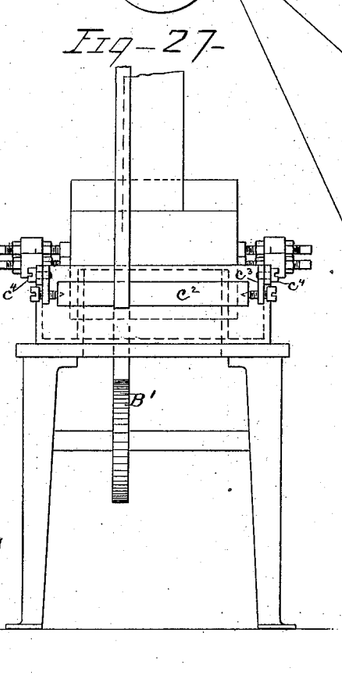

It is sometimes found desirable to have two or more paste-rolls, the under surface of which is in the same horizontal plane, and for this reason said rolls can be placed in the same paste-box, I, as shown in Figs. 25 to 27, in which the paper-roll B' is suspended under the table, and the strip coming therefrom is made to pass through a flat tube, $i$, forming a part of the paste-box and extending from the bottom to nearly the top thereof, and the pasted side of each strip is also in this case made to rub against an acute edge to remove any excess of paste, and under guide-rolls $c^2$, pivoted to the end of adjustable arms $C^3$, similar to those shown in Fig. 1. In front of the paste-roll $C^2$ a scraper, $I^2$, is secured to the sides of the box, and carries the roller $c^2$ upon arms $c^3$, secured at any desired angle to the lugs formed at the ends of said scraper.

Having now fully described our invention, we claim—

1. In a box-covering machine, the paste-boxes provided with an acute edge and a roll, $c^2$, in advance thereof, with roll-carrying arms $c^3$, adjustably secured to each paste-box by the screws $c^4$, forming the pivots for said arms, substantially as and for the purpose described.

2. The combination of the side frames, provided with slots $a^2$ for the passage of roll-bearing screws $a$, and paper-carrying roll D, with bearing-screws $a$ at each end of said roll, and jam-nuts $a'$ upon said screws to regulate the height of each end of said roll, substantially as and for the purposes set forth.

3. The combination of the side frame of the machine, the angularly-adjustable rod $e^4$ and adjustable clamp $e^3$ thereon, with shaft $e$ and expansive box-block formed of pieces E, substantially as and for the purpose described.

4. In combination with a box-block, the bottom presser, composed of a disk, $f^2$, upon the end of the presser-rod $f$, adapted to slide in bearings $F^4$, connected with the frame of the machine, the sleeve $f^4$, having tapering chamber $f^8$, and spring-latch $f'$, substantially as and for the purpose described.

5. The combination of the side frame, rod F, projecting therefrom, rod $F^2$, adjustably secured thereto, sleeve $F^4$ thereon, provided with latch-pin $f^{12}$, presser-rod $f$, and spring-latch $f'$, provided with notch to engage with latch-pin, substantially as and for the purpose described.

6. The combination of presser-rod $f$, sleeve $F^5$ thereon, and spring-latch $f'$ with disk $f^2$, adapted to revolve upon the end of the presser-rod, adjusting-nuts $f^7$, and sleeve $f^4$, substantially as and for the purpose described.

7. The combination of the rubbing-roller G, its supporting-arms G', and pivot-pin $g$ with adjustable bearing $g'$, rocking arm $g^3$, and shaft $g^5$, retained in bearings vertically adjustable upon the frame, substantially as and for the purpose described.

8. The combination of the vertically-adjustable shaft $g^5$, rocking arm $g^3$, arm G', and roller G with crank $g^{13}$, connecting-rod $g^7$, and bell-crank lever $g^8$, provided with swinging treadle $g^9$, substantially as and for the purpose described.

9. In combination with the ledger-blade, transverse rods H and $A^7$, and sleeve H', carrying the shaft of the revolving cutter, the arm $H^3$, secured to said sleeve, and rod $h^6$, carrying a coiled spring, substantially as and for the purpose described.

10. In combination with sleeve H', carrying the shaft of the rotary cutter, the shaft $h$, provided with slots $h^{14}$ and screws $h^{15}$, secured to said sleeve and entering loosely within said slots, substantially as and for the purpose described.

11. In combination with the shaft of the rotary cutter, provided with slots in the sides thereof, the sleeve H', shaft-retaining screws $h^{16}$, secured thereto, and supporting-screw $h^{13}$ in the rear thereof, substantially as and for the purpose described.

12. The combination of the shaft of the rotary cutter, stud $h^{16}$, secured thereto, and operating-rod $H^7$, connected with said stud, the shaft-supporting sleeve provided with a slot, $h^{17}$, to receive said stud loosely, substantially as and for the purpose described.

13. In combination with a series of paste-rolls, a paste-box provided with a tubular passage-way, $i$, extending upward from the bottom of the box through the paste therein, substantially as and for the purpose described.

In testimony whereof we affix our signatures in presence of two witnesses.

CHARLES HENRY MANNECK.
WILLIAM WITTE.

Witnesses:
HENRY MANNECK,
JNO. B. COLE.